United States Patent
Piacenti et al.

(10) Patent No.: US 8,474,608 B2
(45) Date of Patent: Jul. 2, 2013

(54) CONVEYOR BELT GUARD PANEL BLANK HAVING INTEGRALLY FORMED HANDLES AND METHOD OF FORMING A CONVEYOR BELT GUARD PANEL

(75) Inventors: Jared Piacenti, Tiskilwa, IL (US); David Mueller, Neponset, IL (US); Robert Todd Swinderman, Palm Coast, FL (US)

(73) Assignee: Martin Engineering Company, Neponset, IL (US)

( * ) Notice: Subject to any disclaimer, the term of this patent is extended or adjusted under 35 U.S.C. 154(b) by 317 days.

(21) Appl. No.: 12/954,224

(22) Filed: Nov. 24, 2010

(65) Prior Publication Data

US 2012/0125744 A1 May 24, 2012

(51) Int. Cl.
*B65G 21/00* (2006.01)
(52) U.S. Cl.
USPC ........................................................ 198/860.3
(58) Field of Classification Search
USPC ............. 198/735.5, 818, 836.1, 860.3, 860.5, 198/866
See application file for complete search history.

(56) References Cited

U.S. PATENT DOCUMENTS

| | | | |
|---|---|---|---|
| 3,254,428 | A | 6/1966 | Bates |
| 3,887,973 | A | 6/1975 | Coon |
| 4,819,790 | A | 4/1989 | Adcock |
| 5,584,430 | A | 12/1996 | Mulry |
| 2001/0020618 | A1 | 9/2001 | Kellogg et al. |

OTHER PUBLICATIONS

Photographs of Guard Panel, available to the public at least as early as Nov. 23, 2009, 2 page.
Photograph of Guard Panel, available to the public at least as early as Jul. 2010, 1 page.

*Primary Examiner* — Mark A Deuble
(74) *Attorney, Agent, or Firm* — Thompson Coburn LLP; Clyde L. Smith

(57) ABSTRACT

A conveyor belt guard panel blank comprises a monolithic planar sheet of material of uniform thickness having opposite facing primary surfaces. The sheet of material has a plurality of openings extending therethrough in a manner creating a mesh. The sheet also comprises at least two handle formations that are adapted and configured to be altered in a manner such that the handle formations extend outward from one of the primary surfaces of the sheet of material.

13 Claims, 4 Drawing Sheets

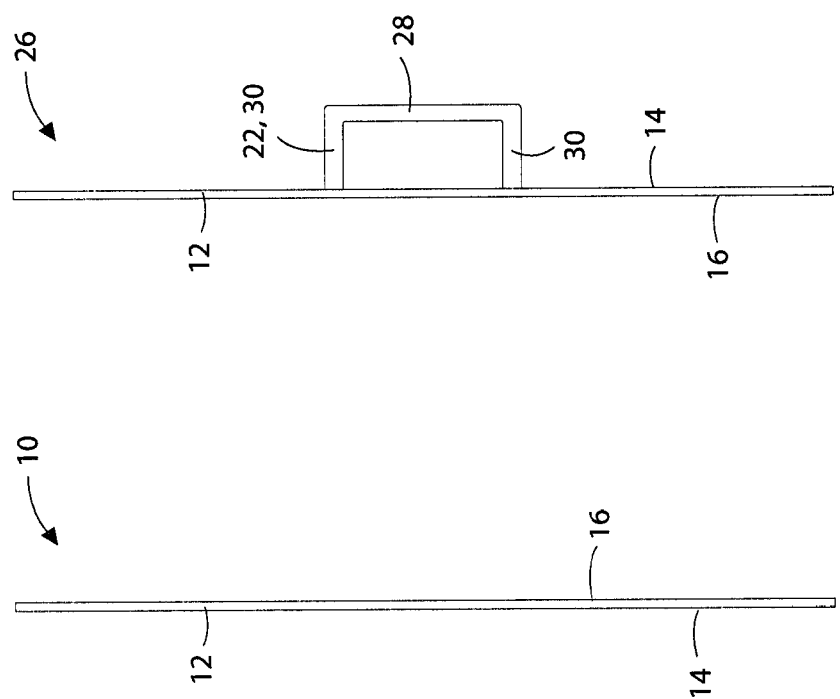

CONVEYOR BELT GUARD PANEL BLANK HAVING INTEGRALLY FORMED HANDLES AND METHOD OF FORMING A CONVEYOR BELT GUARD PANEL

CROSS-REFERENCE TO RELATED APPLICATIONS

Not Applicable

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

This invention pertains generally to bulk material conveyor belt assemblies. More specifically, this in invention pertains to a conveyor belt guard panel blank having integrally formed handle formations that are configured to be altered to form finished handles for lifting the conveyor belt guard panel.

2. General Background

Bulk material conveyor belt assemblies create a hazard to nearby workers when such conveyor belt assemblies are in operation. As such, the Mine Safety and Health Administration of United States Department of Labor and other mine safety organizations and administrations imposes numerous regulations on the operation of conveyor belt assemblies.

The most dangerous aspect of operation conveyor belt assemblies involve the unintentional intake of clothing or human limbs between a moving conveyor belt and the rollers the support the weight of said conveyor belt. Due to the enormous momentum of the bulk material frequently carried on a conveyor belt, once clothing or limbs gets trapped between a moving conveyor belt and a roller, a worker is virtually helpless at preventing serious injury or death. For this reason, there are strict rules regarding reaching above or below moving conveyor belts, even when using tools to do so. Yet knowledge of this danger is often not enough to prevent workers from reaching above or below moving conveyor belts. As such, conveyor belt assemblies often include guard panels to prevent workings from accidentally or deliberately falling into or contacting a moving conveyor belt with their body, a limb, clothing, or tool.

Conveyor belt guard panels are typically rectangular and typically comprise a mesh screen which allows workers to view and inspect the operation of the conveyor belt assembly while the guard panel is in place. The guard panels also typically include a rectangular perimeter frame made up of weld strip metal, to which the mesh is welded. A pair of handles is often attached to the mesh or frame by bolts or welding to facilitate the removal and installation of guard panel. A guard panel is typically attached to the frame of the conveyor belt assembly via four bolts or clamps attached around the perimeter of the guard panels.

While such guard panels are useful and effective, they are also costly and require a significant amount of man-hours to assemble or manufacture.

SUMMARY OF THE INVENTION

The present invention reduces the amount man-hours required to fabricate conveyor belt guard panels, thereby reducing the costs as well. Additionally, the present invention allows a large number guard panel blanks to be stacked and shipped on a single standard pallet. The blanks can quickly be transformed into completed guard panels using only the most basic tools and no additional parts.

In a first aspect of the invention, a conveyor belt guard panel blank comprises a monolithic planar sheet of material of uniform thickness having opposite facing primary surfaces. The sheet of material has a plurality of openings extending therethrough in a manner creating a mesh. The sheet also comprises at least two handle formations that are adapted and configured to be altered in a manner such that the handle formations extend outward from one of the primary surfaces of the sheet of material.

In another aspect of the invention, a method of forming a conveyor belt guard panel comprises obtaining a panel blank in the form of a monolithic planar sheet of material of uniform thickness having opposite facing primary surfaces. The sheet of material has a plurality of openings extending therethrough in a manner creating a mesh. The sheet also comprises at least two handle formations. The method further comprises altering the handle formations in a manner such that the handle formations extend outward from one of the primary surfaces of the sheet of material.

Further features and advantages of the present invention, as well as the operation of the invention, are described in detail below with reference to the accompanying drawings. Addiment

BRIEF DESCRIPTION OF THE DRAWINGS

FIG. 2 depict a right side view of the guard panel blank of FIG. 1.

FIG. 3 depict a left side view of a guard panel formed from the guard panel blank shown in FIGS. 1 and 2.

Figure 1:
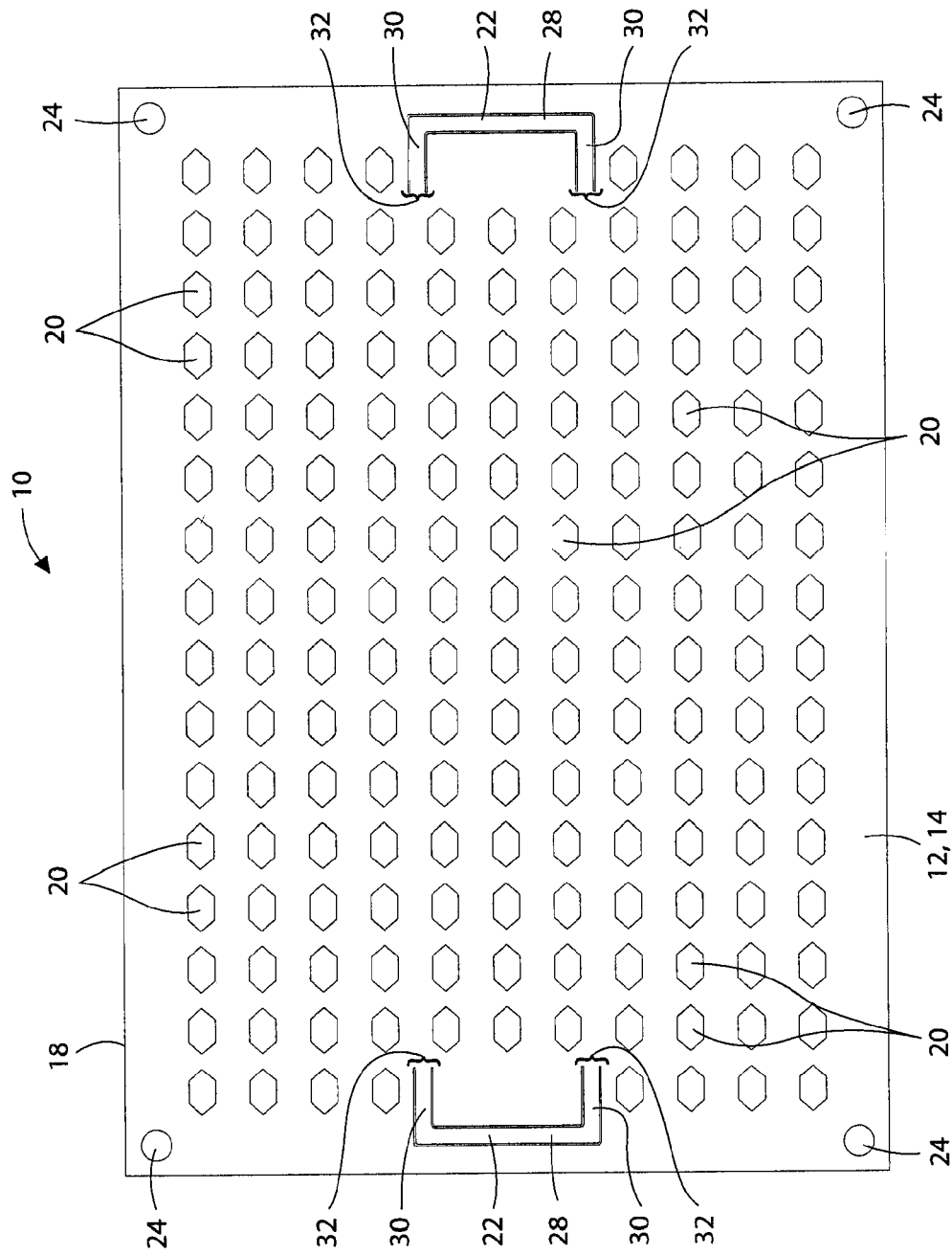
FIG. 1 depicts a front view of one embodiment of a conveyor belt guard panel blank in accordance with the invention.

Reference numerals in the written specification and in the drawing figures indicate corresponding items.

DETAILED DESCRIPTION

A front view of a first embodiment of a conveyor belt assembly guard panel blank (represented generally by the numeral 10) is shown in FIG. 1. The guard panel blank 10 comprises a rectangular sheet of material 12 of uniform thickness having opposite facing primary surfaces, namely and front 14 and rear 16 surfaces. The sheet of material 12 is preferably formed by laser cutting through an uninterrupted thin sheet of steel, but it could also be form using convention techniques such as milling, die cutting, water jet cutting, electric discharge machining, etc. Preferably, the sheet of material 12 is left with an uninterrupted rectangular perimeter 18. Within the perimeter 18, a plurality of openings 20 are formed in a manner creating a mesh in a portion of the remaining material. A pair of handle formations 22 are also preferably formed within the bounds of the perimeter 18. Still further, a plurality of mounting holes 24 are preferably form adjacent the corners of the perimeter 18.

As seen from the side in FIG. 2, the guard panel blank 10 is very thin and therefor numerous identical guard panels can be stacked upon each other in a manner taking minimal space. This simplifies the transportation and storage of such guard panels blanks 10 and thereby reduces the cost of transporting and storing the guard panel blanks. Moreover, unlike convention guard panels that are assembled by welding several components together, no welding or assembly of the guard panel blank 10 is required and a fully complete guard panel can be easily formed from the guard panel blank with virtually no special skills, and after the guard panel blank has been delivered to an installation site.

To form a complete guard panel 26, as shown in FIG. 3, from the guard panel blank 10, a person need only to bend the handle formations 22 in manner such that they extend outward from the front surface 14. The handle formations 22 are preferably u-shaped with a middle portion 28 and opposite ends 30. The middle portion 28 of each handle formation 22 is configured to serve as a handgrip and is dimensioned accordingly. The opposite ends 30 of each handle formation 22 extend from the middle portion 28 at an angle and secure the handle formations to the other portions of the sheet of material 12. The handle formations 22 are bent to form the complete guard panel by prying the middle portions 28 outward relative to the front surface 14, preferably using a standard screwdriver. This causes the roots 32 of the opposite ends 30 of each handle formation 22 to deform and yield in a manner such that afterwards the handle formations remain rigidly fixed to the other portions of the sheet of material 12, but extend outward from the front surface 14.

Once completed, the complete guard panel 26 function similar to prior art guard panels and can be lifted and positioned with the aid of the handgrips formed by the middle portions 28 of the handle formations 22. Like prior art conveyor belt guard panels, the complete guard panel 26 can be attached to a conveyor belt system by passing retaining members through at least two of the mounting holes 24 in a manner securing the complete guard panel to the remainder of the conveyor belt system.

Figure 4:
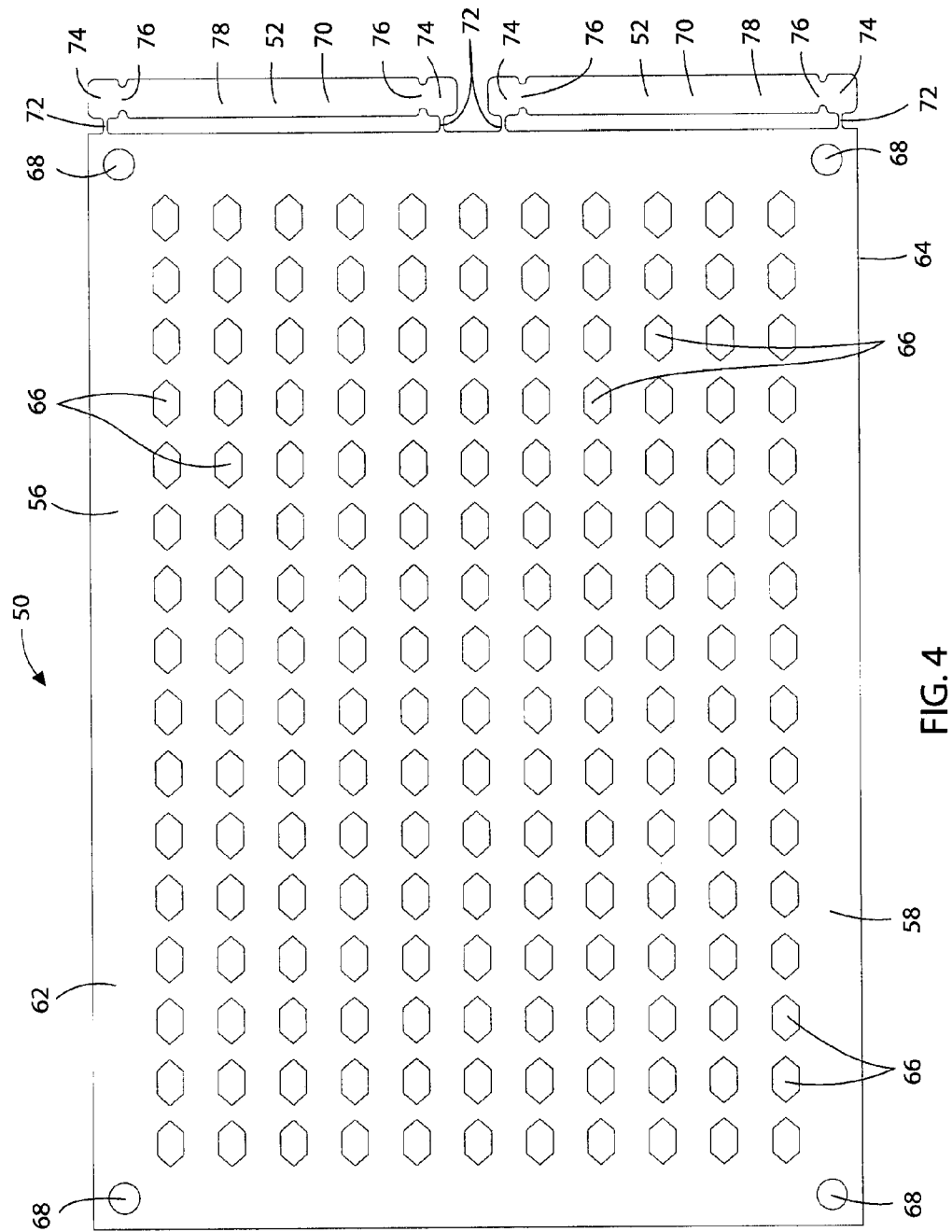
FIG. 4 depicts a front view of another embodiment of a conveyor belt guard panel blank in accordance with the invention.
Figure 6:
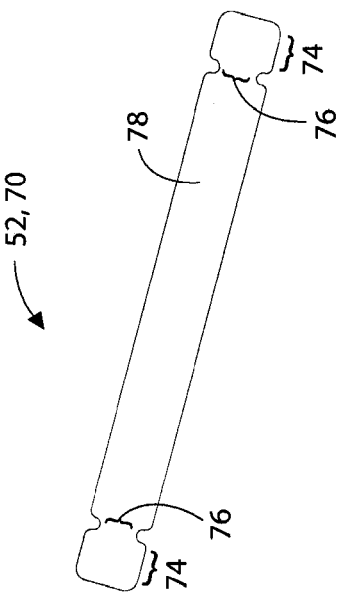
FIG. 6 depicts a handle formation after is has been removed from the remainder of the guard panel blank shown in FIGS. 4 and 5.
Figure 5:
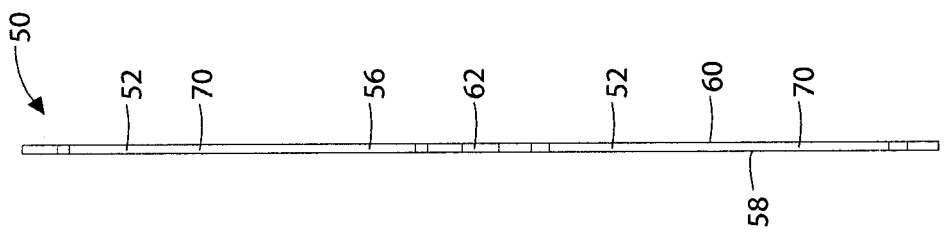
FIG. 5 depict a right side view of the guard panel blank of FIG. 4.

A front view of a second embodiment of guard panel blank 50 is shown in FIG. 4. This guard panel blank 50 shares many features in common with the guard panel blank 10 of the first embodiment, but is configured with handle formations 52 adapted to be removed and reattached to form a complete guard panel 54. Like the first guard panel blank 10, the second guard panel blank 50 comprises a generally rectangular sheet of material 56 of uniform thickness having opposite facing front 58 and rear 60 surfaces. The sheet of material 56 has a rectangular main portion 62 and the handle formation 52 are formed adjacent to one of the sides edges of the main portion. Within the perimeter 64 of the main portion 62, a plurality of openings 66 are formed in a manner creating a mesh in a portion of the remaining material. Additionally, a plurality of mounting holes 68 are preferably form adjacent the corners of the main portion 62. The handle formations 52 preferably comprise elongate strips 70 attached to the main portion 62 via narrow bridges 72 of the sheet material. The bridges 72 are configured and adapted to be broken by moving the elongate strips 70 relative to the other portions of the sheet of material 56, thereby separating the elongate strips from the main portion 62 of the guard panel blank 50. As is shown in FIG. 6, each of the elongate strips 70 has longitudinally opposite end portions 74 and each of the end portions comprises a region of weakness 76 that is configured and adapted to serve as a fold line. Preferably the region of weakness 76 is a necked-down portion but other things, such as a line of perforations, achieve the desired result equally well. The regions of weakness 76 of each elongate strip 70 are configured to bend and yield in manner such that the end portions 74 are angled relative to the middle portion 78 of the elongate strip.

Figure 7:
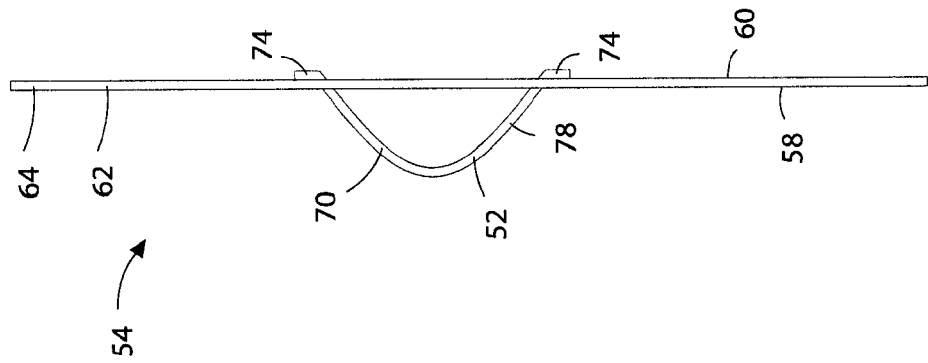
FIG. 7 depicts a left side view of a guard panel formed from the guard panel blank shown in FIGS. 4 and 5.

The guard panel blank 50 of this second embodiment has the same advantages in shipping and fabrication as does the first embodiment described above and can easily be converted to a complete guard panel blank 54 (as shown in FIG. 7). The guard panel blank 50 is converted into a complete guard panel 78 by first breaking the bridge portions 74 that attach the handle formations 52 to the main portion 62 of the guard panel blank. This can easily be done by rocking the handle formation 52 back and forth relative to the main portion 62 of the guard panel blank 50 via a pair of pliers. With the handle formations 52 detached, the regions of weakness 76 of each elongate strip 70 are then bent and deform in manner such that the end portions 74 are angled relative to the other portion of the elongate strip. Additionally, the middle portion 78 of each elongate strip 70 is bent in a manner forming an arcuate handgrip. Each handle formation 52 is reattached to main portion 62 of the now dismantled guard panel blank 50 by passing each of its end portions 74 through a respective one of the openings in the main portion 62 of the sheet of material 56 in a manner such that the end portions interlock the handle formation with main portion of the sheet of material as shown in FIG. 7. With the handle formations 52 reattached to the main portion 62 of the sheet of material 56, the middle portions 78 extend outward from the front surface 58 of the main portion, thereby transforming the guard panel blank 50 into a complete guard panel 54. The complete guard panel 54 can then be utilized in the same manner as the complete guard panel 26 formed from the guard panel blank 10 of the first embodiment.

In view of the foregoing, it should be appreciated that the invention achieves the several advantages over prior art conveyor belt guard panels.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

It should also be understood that when introducing elements of the present invention in the claims or in the above description of exemplary embodiments of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations. Still further, the order in which the steps of any method claim that follows are presented should not be construed in a manner limiting the order in which such steps must be performed.

What is claimed is:

1. A conveyor belt guard panel blank comprising:
    a monolithic planar metal sheet of uniform thickness having opposite facing primary surfaces, the metal sheet having a plurality of openings extending therethrough in a manner creating a mesh, the metal sheet also comprising at least two handle formations that are adapted and configured to be plastically deformed in a manner such that the handle formations extend outward from one of the primary surfaces of the metal sheet, wherein the metal sheet has an uninterrupted rectangular outer perimeter and the handle formations are encircled by the perimeter.

2. A conveyor belt guard panel blank in accordance with claim 1 wherein the handle formations are adapted and configured to be deformed in the manner such that the handle formations extend outward from the one of the primary surfaces of the metal sheet by bending the handle formations without disconnecting the handle formations from all other portions of the metal sheet.

3. A conveyor belt guard panel blank in accordance with claim 1 wherein each of the handle formations is u-shaped with opposite ends, and the opposite ends of the handle formations secure the handle formations to the other portions of the metal sheet.

4. A conveyor belt guard panel blank in accordance with claim 1 wherein the handle formations are adapted and configured to be deformed in the manner such that the handle formations extend outward from the one of the primary surfaces of the metal sheet by separating the handle formations from the metal sheet and thereafter bending and reattaching the handle formations to the metal sheet by passing portions of the handle formations through some of the openings and bending the handle formations.

5. A conveyor belt guard panel blank in accordance with claim 4 wherein each of the handle formations is an elongate strip that is attached to all other portions of the metal sheet by only narrow bridges of the metal sheet, and the bridges are configured and adapted to be broken by moving the elongate strips relative to the other portions of the metal sheet.

6. A conveyor belt guard panel blank in accordance with claim 5 wherein each of the elongate strips of the material has longitudinally opposite end portions and each of the end portions comprises a region of weakness that is configured and adapted to serve as a fold line.

7. A method of forming a conveyor belt guard panel, the method comprising:

obtaining a panel blank in the form of a monolithic planar metal sheet of uniform thickness having opposite facing primary surfaces, the metal sheet having a plurality of openings extending therethrough in a manner creating a mesh, the metal sheet also comprising at least two handle formations; and plastically deforming the handle formations in a manner such that the handle formations extend outward from one of the primary surfaces of the metal sheet, wherein the metal sheet has an uninterrupted rectangular outer perimeter and the handle formations are encircled by the perimeter prior to being deformed.

8. A method in accordance with claim 7 further comprising forming the panel blank from a single uninterrupted metal sheet by removing some material therefrom.

9. A method in accordance with claim 7 wherein each of the handle formations is u-shaped with opposite ends, the opposite ends of the handle formations secure the handle formations to all other portions of the metal sheet, and the deforming of the handle formations occurs by bending the opposite ends of the handle formations in a manner such that the handle formations extend outward from the one of the primary surfaces of the metal sheet.

10. A method in accordance with claim 7 further comprising forming the panel blank from a single uninterrupted metal sheet by removing some metal therefrom.

11. A method in accordance with claim 8 wherein the deforming of the handle formations comprises separating the handle formations from the metal sheet and thereafter bending and reattaching the handle formations to the metal sheet by bending the handle formations and extending portions of the handle formations through some of the openings.

12. A method in accordance with claim 11 wherein each of the handle formations is an elongate strip of the material that is attached to all other portions of the metal sheet by only narrow bridges of metal sheet, and the deforming of the handle formations comprises breaking the bridges by bending the bridges.

13. A method in accordance with claim 12 wherein each of the elongate strips of the material has longitudinally opposite end portions and each of the end portions comprises a region of weakness, and the reattaching of the handle formations to the metal sheet occurs by bending the elongate strips at their regions of weakness and extending the end portions of each of the elongate strips through a respective one of the openings.

\* \* \* \* \*